June 26, 1934.   G. CUTTAT   1,964,196
REGULATOR FOR HYDRAULIC CYLINDERS
Filed Oct. 21, 1929    2 Sheets-Sheet 1
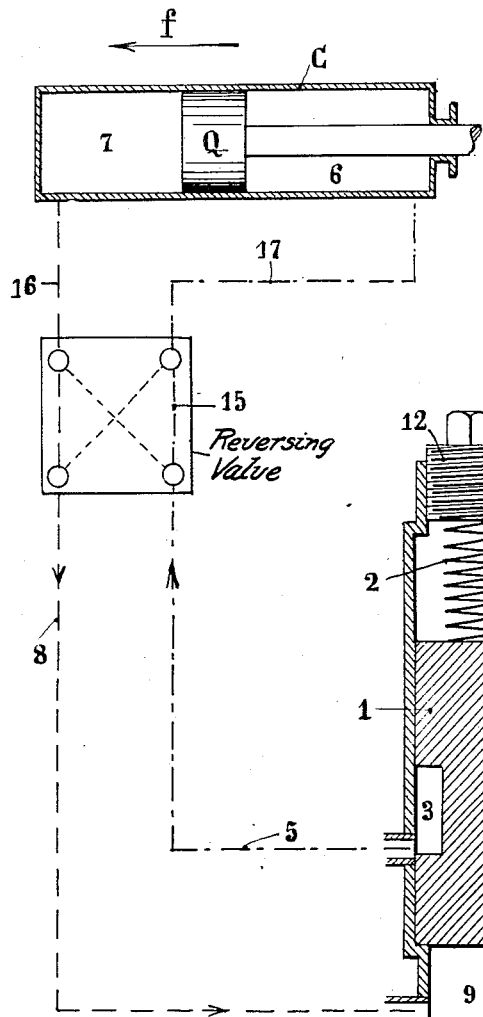
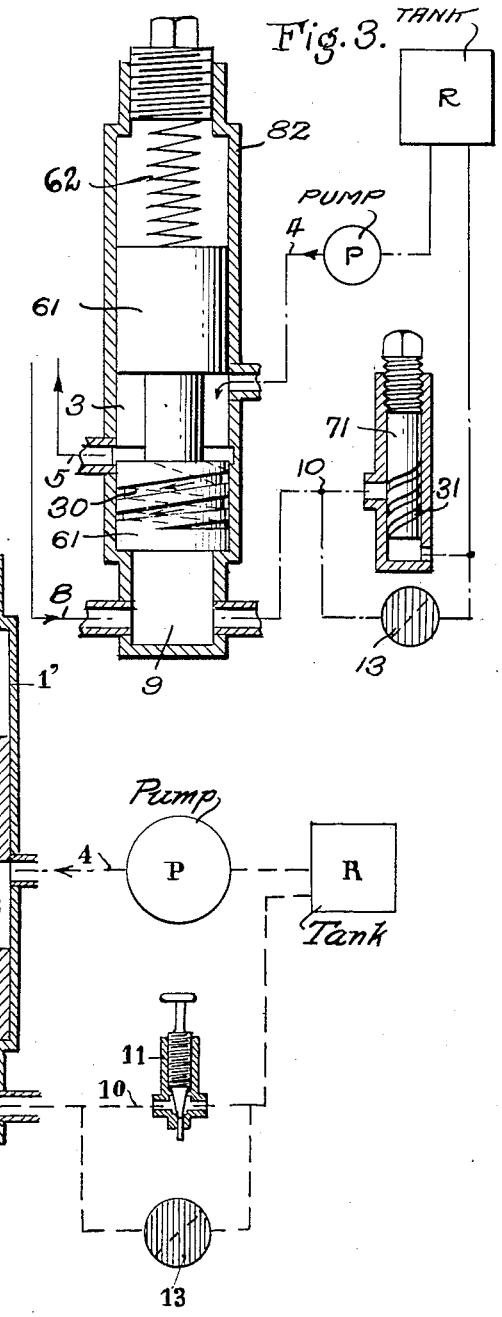

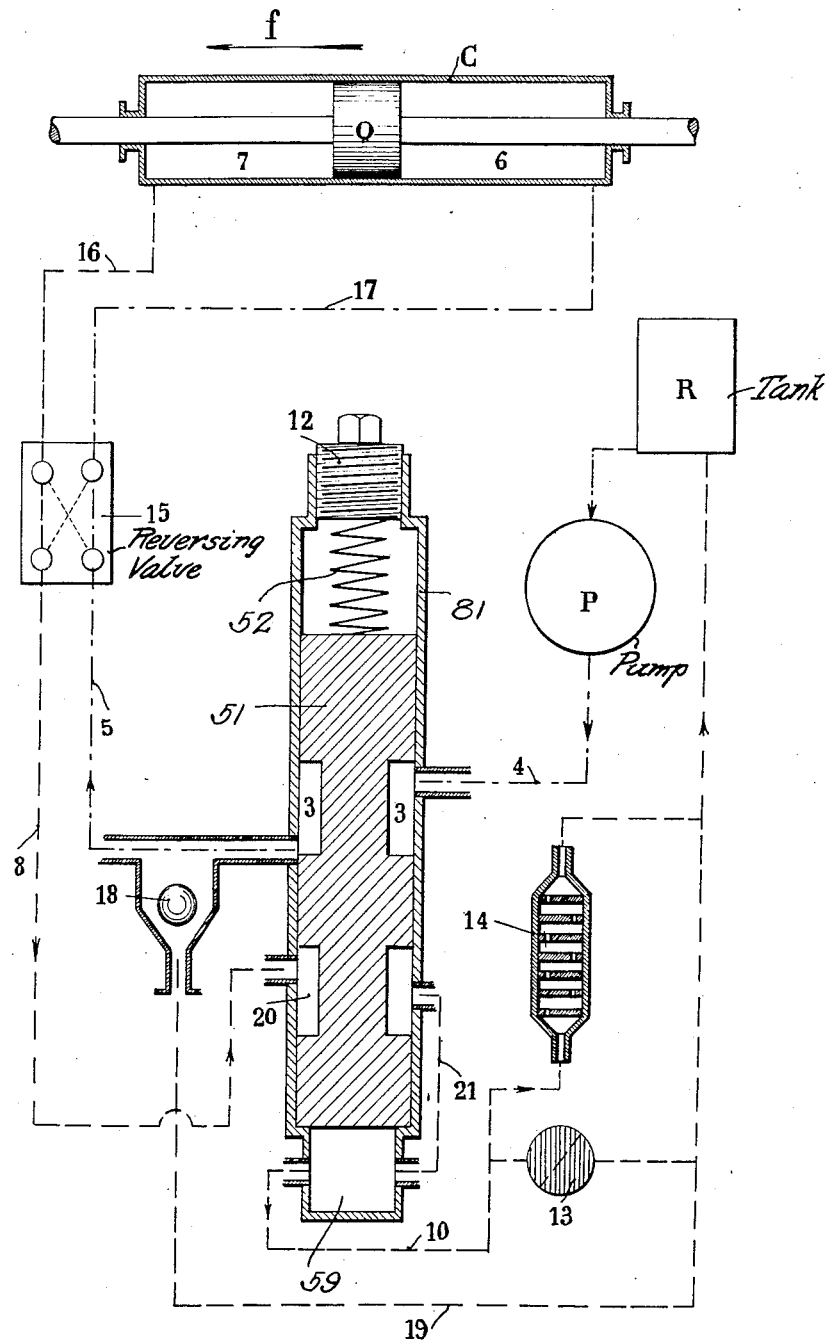

Patented June 26, 1934

1,964,196

UNITED STATES PATENT OFFICE 1,964,196

REGULATOR FOR HYDRAULIC CYLINDERS

Georges Cuttat, Paris, France, assignor to Société Anonyme des Etablissements Cuttat, Paris, France Application October 21, 1929, Serial No. 401,359
In France July 17, 1929

3 Claims. (Cl. 60—52)

When a hydraulic cylinder is used for exerting its action on a variable resistance such as that encountered in machine-tools, lifting or hoisting apparatus, etc., it is often necessary to maintain constant and notwithstanding the variations of the load, the speed of the piston moving in the cylinder.

Up to now, this result has been obtained by using, for feeding this cylinder, systems of pumps having a variable output; this arrangement presents various disadvantages; thus, when the force with which the piston acts and which, ordinarily, constitutes the resistance, takes the direction of movement of the piston, this force is added to the driving stress, so that the pump then operates as a motor. The regulation becomes defective if use is not made of means increasing the passive resistances.

This problem of regulation has been partially solved, on the other hand, by the use of pumps having a constant output, by throttling the admission of fluid under pressure to the cylinder, or, which comes to the same thing, by throttling the section of the pipe line ensuring the return of the fluid coming from the discharging chamber of the cylinder.

It will be understood that, in this case, for a given value of throttling and for a given pressure, the flow of the fluid is constant. Consequently, the speed of advance of the piston and of the device moved by the latter is also constant.

If the resistance opposed by the device to be moved should vary, a variation of pressure of the operative chamber (in the first case) or of the back-pressure in the discharge chamber (in the second case) takes place. The pressure thus varying, for one and the same value of throttling, the speed of flow of the fluid through the said throttled portion varies in the same way and, consequently, the speed of advance of the piston is modified.

This arrangement can be suitable in certain cases, but if it is necessary to obtain an absolutely constant speed for the device to be moved, and this whatever may be, in the power limits, the value or the direction of the resistance of this device, the simple throttling could not be suitable.

The invention precisely consists in a device satisfying the above conditions.

This device is essentially characterized by the fact that it is provided, on the exhaust pipe line, with a fixed throttling device and, on the inlet pipe line, with a variable throttling device. The section of the opening of the latter depends on the value taken by the pressure of the fluid at the time this fluid passes the fixed throttling device, so that this section is function of the linear speed of the piston. In fact, the pressure depends on the speed of the fluid, which is itself function of this linear speed of the piston.

In the device forming the subject-matter of the invention, this pressure is constant on one end of a core which is subjected, on its other end, to a constant spring pressure. The value of the variable throttling, on the inlet pipe line precisely depends on the position of the core, that is to say on the pressure of the fluid when passing through the fixed throttling device.

The invention also consists in a form of construction of such a regulating device operating in such a manner as to regulate also the speed of the piston when the force which is opposed to it takes a reverse direction, and becomes positive; for that purpose, a supplementary variable throttling device acts on the exhaust.

Another object of the invention resides in the special constitution given to the fixed throttling device, which is adjustable in value.

In any case, on the circuit can be placed a device allowing to reverse the direction of movement of the piston; this reversing device can be constituted by an automatic member, for instance, by application of the means described in the United States patent application filed on October 21, 1929 for: Valve for the distribution of a moving fluid in a hydraulic cylinder, Serial No. 401,358.

These various forms of construction are illustrated in the accompanying drawings:

Fig. 1 diagrammatically illustrates a simple form of this regulator, arranged for obtaining a constant regulation when the force to be overcome is directed in a direction opposed to the direction of advance of the piston.

Fig. 2 illustrates the same regulator modified for obtaining a constant regulation whatever may be the direction of the force to be overcome, that is to say whether this force is directed in a direction opposed to or in the same direction as the direction of advance of the piston.

Fig. 3 is a view somewhat diagrammatic of a modified form of the invention.

The regulator (Fig. 1) substantially comprises a core 1, movable in a housing 1' and constantly subjected to the action of a spring 2. This core is provided with a circular groove 3 in which opens the pipe line 4 extending from the pump P or from any other source of fluid under pressure. From this groove extends a pipe line 5, through which the fluid under pressure is supplied to the operative chamber 6 of the cylinder C in which moves the piston Q, the driving stress of the piston exerting itself in the direction of the arrow $f$. The discharge chamber 7 of the cylinder is connected through the exhaust pipe line 8, to a back-pressure chamber 9, through which the fluid passes before returning to the tank R. This chamber is connected to the tank by a pipe line 10, on which is mounted a throttling device 11, the section of passage of which is fixed, but can be regulated by any suitable means.

The cylinder C to which the invention is applied is of the type in which a fluid under pressure, preferably oil, serves as a driving agent for displacing a piston which controls the device to be operated.

The operation of the device is as follows:

The piston Q moving in the cylinder C actuates, through its rod, in the direction $f$, the device to be moved. The cylinder is fed by the pipe line 5, and the fluid contained in the chamber 7 of this cylinder returns to the pump and to the tank through the pipe lines 8 and 10. The value of the section of the fixed throttling device 11, as well as the strength of the spring 2 are so chosen that the core 1 uncovers to a suitable extent the entrance of the pipe line 5 opening in the groove 3. It will be understood that the fixed throttling device 11 causes a pressure to exist in the chamber 9, which pressure normally balances the action of the spring 2.

The fluid then flows at a constant speed from the pump P to the pipe line 5, if the resistant stress which must be overcome by the piston Q does not vary.

If, on the contrary, the value of this resistant stress diminishes, the speed of the piston immediately increases and the speed of the fluid driven through the exhaust pipe line 8 also increases. As the section of passage of the throttling device 11 is rigourously fixed, the increase of speed of the fluid will have for result to increase the pressure existing before this throttling device, that is to say in the chamber 9. This over-pressure pushes back the core 1, against the action of the spring 2, so that the opening of the pipe line 5 in the groove 3 of the core is progressively obturated, the admission of the fluid in this groove, through the pipe line 4, remaining, on the contrary, free, so that the core is not subjected to any lateral reaction due to the pressure of the fluid. The admission of the fluid under pressure into the cylinder is thus progressively throttled, so that the driving stress on the piston decreases.

If, at a certain moment of the stroke of the piston, the resistant stress opposed to the latter increases, the pressure in the chamber 9 diminishes, and the core 1 moves in opposite direction, thus progressively uncovering the entrance of the inlet pipe line 5: the driving stress on the piston increases.

The normal position of the core 1 in its housing can be adjusted by acting on a screw 12 against which bears the spring 2.

Use can be made of a valve 13, shunting the fixed throttling device 11 and allowing, in case of need, to eliminate the regulation effect.

To the entire regulating system of the system can be added a member 15 ensuring the reversal of the direction of movement of the piston in this cylinder.

When the driving stress on the piston is exerted in the direction $f$, the fluid under pressure coming from the pump P is admitted in the operative chamber 6 of the cylinder through the pipe lines 5 and 17, the exhaust taking place through 16 and 8.

When the driving stress is exerted in the direction opposed to $f$, the admission takes place through the pipe lines 5 and 16 and the exhaust through the pipe lines 17 and 8, this reversal being produced by manipulation of the reversing member 15.

It has been seen that for a given fixed throttling device and for a given adjustment of the spring 2, a speed which is function of these two values is obtained.

This modification is given only by way of indication, as it is always possible to modify the value of the piston speed by modifying the tension of the spring 2 by means of the screw 12.

In the device which has just been described, the speed is controlled by the throttling of the admission which varies from its maximum opening to zero.

A constant speed is thus obtained for different values of the stress to be overcome by the piston Q moving, in the example considered, in the direction $f$.

But, in certain cases, this stress can become null and can even be directed in the same direction as the direction of displacement of the piston. It is then added to that of the fluid pushing back the piston Q (this case would occur particularly in the application to a milling machine, the rotation of the milling cutter of which would be directed in the same direction as the progression of the table).

In this case, the regulator forming the subject of this invention will be constructed as in Fig. 2.

It has already been seen that, when the direction of the forces to be overcome is directed in a direction reverse to $f$, the throttling is produced through the annular chamber 3. If this stress changes in direction, the pipe line 5 becomes progressively entirely obturated and a vacuum tends to be created in the chamber 6; a valve 18 is provided (Fig. 2) which allows the fluid, coming from the tank R through the pipe line 19, to freely enter the chamber 6. At this moment, the regulation is obtained by the effort which must be made by the piston Q (effort from which must be deducted the value of the effort proper of the working) for driving the fluid out of the chamber 7.

In these conditions, the speed may happen to exceed the value corresponding to the adjustment of the spring 52, and the pressure in the chamber 59 increasing, pushes back the core 51 still farther in the housing 81, this having for effect to cause a supplementary throttling device, mounted on the exhaust pipe line, to act.

For that purpose, a chamber or second annular groove 20 is provided, through which the exhaust fluid admitted through the pipe line 8 must pass before entering the chamber 59. The progressive pushing back of the core 1 has then for effect to throttle the opening of the pipe line 21 in the groove 20, and the exhaust of the fluid driven back from the chamber 7 towards the tank is thus braked. The back pressure at 59 being provided on the down side of the throttling device, the latter will take a value in relation with the back pressure 59 regulated by the spring 52. In this case, the regulator acts as a brake.

The fixed throttle device can also be constituted (Fig. 2) by a closed chamber 14 in which are superposed, without being in contact a series of washers each perforated with one or more orifices arranged in staggered relation from one washer to the other. The fluid entering at the base of this chamber must pass through the entire series of washers before reaching the outlet. These successive throttlings are, as will be seen, established in such a manner that their elementary resistances are added to each other, this allowing to obtain a sufficient total resistance opposed to the return of the fluid, although the section of passage through each washer may be relatively great, these washers then offering no difficulty for their manufacture, and the device reducing to a large extent any risk of obstruction.

Fig. 3 illustrates improvements which give to the regulator a more progressive action and ensure great ease in the adjustment.

These improvements essentially consist in forming grooves having a depth decreasing down to zero, on the portions of the cores, or other movable members, which, in course of operation, have for function to alternately cover and uncover the orifices for the passage of the fluid in the pipe lines.

On the obturating portion of the core 61 in the housing 82 is provided a groove 30 which is formed according to a helix on the periphery of the core (Fig. 3); the depth of this groove progressively decreases so that, when the core effects its down stroke, the obturation of the pipe line 5 very progressively takes place and the effect of regulation of the speed of the piston occurs with great smoothness.

On the other hand, for regulating the fixed throttling to a suitable value, without having to use a needle valve, while maintaining the advantages of the system shown at 14 in Fig. 2, use is made of a cylindrical rod 70, also provided with a helical peripheral groove 31 coming opposite the pipe line 10. The rod 70 has a screw-threaded portion allowing to displace it in its sheath so that the throttled length of the pipe line, offered to the fluid, varies with the operative portion of the groove 31. The construction of this member is simple and the adjustment is instantaneously effected.

The possibility of an immediate regulation through the throttling device 71—31 allows to do away with the repeated adjustment of the spring 62, for causing the speed of piston 61 to vary. This spring can be adjusted once for all by the manufacturer.

It is to be noted that the helical grooves being formed on the periphery of the core, the fluid under pressure acts on the circumference of this core, which is thus balanced.

The improvements of Fig. 3 which has just been described are applicable in all cases in which a pipe line must be obturated or uncovered with great progressiveness. These applications are also included in the scope of the invention.

Finally, it will be understood that the regulating device which, in the example under consideration, serves to regularize the operation of a cylinder moved by a fluid, is quite as well applicable as a regulator for a motor also moved by a fluid.

I claim:

1. A regulating device to act on the speed of admission of the fluid under pressure in a hydraulic cylinder, comprising a cylinder adapted to receive a fluid under pressure, a piston in said cylinder, an exhaust line leading from said cylinder, a fixed throttling device in said exhaust line, a fluid pressure generator, a single admission line between said generator and the cylinder, a primary variable throttling device in the admission line, a second variable throttling device in the exhaust line between the cylinder and the fixed throttle, a common movable element to vary the opening of the two variable throttling devices, means to displace said movable element in accordance with the pressure in the exhaust line in front of the fixed throttle.

2. A regulating device to act on the speed of admission of the fluid under pressure in a hydraulic cylinder, comprising a cylinder adapted to receive a fluid under pressure, a piston in said cylinder dividing the latter in a working chamber and an exhaust chamber, an exhaust line connected to the exhaust chamber, a fixed throttling device in said exhaust line, a fluid pressure generator, a single admission line between said generator and the working chamber of the cylinder, a housing interposed on the last named line, a movable core in said housing, an inner grooving on said core adapted to exert on the admission line a variable throttling effect in accordance with the position of said core, a second inner groove milled in said core into which opens the exhaust line, a counter-pressure chamber on one side of the core, a communication between said second groove and the counter-pressure chamber, an element on the core adapted to exert on said communicating line a variable throttling effect, a communication between the said counter-pressure chamber and the fixed throttle, means to constantly exert pressure on the core and opposed to that prevailing in the said counter-pressure chamber, means to vary the opening of the throttle on the exhaust line.

3. A regulating device to act on the speed of admission of the fluid under pressure in a hydraulic cylinder, comprising a cylinder adapted to receive a fluid under pressure, a piston in said cylinder dividing the latter in a working chamber and an exhaust chamber, an exhaust line connected to the exhaust chamber, a fixed throttling device in said exhaust line, a fluid pressure generator, a single admission line between said generator and the working chamber of the cylinder, a housing interposed on the last named line, a movable core in said housing, an inner grooving on said core adapted to exert on the admission line a variable throttling effect in accordance with the position of said core, a second inner groove milled in said core into which opens the exhaust line, a counter-pressure chamber on one side of the core, a communication between said second groove and the counter-pressure chamber, an element on the core adapted to exert on said communicating line a variable throttling effect, a communication between the said counter-pressure chamber and the fixed throttle, means to constantly exert pressure on the core and opposed to that prevailing in the said counter-pressure chamber, means to vary the opening of the throttle on the exhaust line, a fluid tank feeding the generator, a pipe line connecting the tank and working chamber, a valve placed between the said first groove and the working chamber of the cylinder adapted to uncover said pipe line to permit the fluid of the tank to have direct access to the working chamber.

GEORGES CUTTAT.